United States Patent
Wojdyla et al.

(10) Patent No.: US 11,759,378 B2
(45) Date of Patent: Sep. 19, 2023

(54) WHEELCHAIR DOCKING SYSTEM AND METHOD THEREOF

(71) Applicant: The Braun Corporation, Winamac, IN (US)

(72) Inventors: Adam Wojdyla, Winamac, IN (US); Michael R. Pugh, Winamac, IN (US); Carlos Badallo, Bloomfield, MI (US)

(73) Assignee: The Braun Corporation, Winamac, IN (US)

( * ) Notice: Subject to any disclaimer, the term of this patent is extended or adjusted under 35 U.S.C. 154(b) by 660 days.

(21) Appl. No.: 16/909,243

(22) Filed: Jun. 23, 2020

(65) Prior Publication Data

US 2020/0405550 A1    Dec. 31, 2020

Related U.S. Application Data

(60) Provisional application No. 62/866,064, filed on Jun. 25, 2019.

(51) Int. Cl.
 *B60P 7/08* (2006.01)
 *A61G 3/08* (2006.01)

(52) U.S. Cl.
 CPC .......... *A61G 3/0808* (2013.01); *B60P 7/0807* (2013.01)

(58) Field of Classification Search
 CPC ....... B60P 7/0807; B60P 7/0815; B60P 3/073; A61G 3/0808

(Continued)

(56) References Cited

U.S. PATENT DOCUMENTS

| | | | |
|---|---|---|---|
| 5,489,170 A | 2/1996 | Inoue et al. | |
| 7,717,655 B2* | 5/2010 | Cardona | A61G 3/0808 |
| | | | 410/23 |

(Continued)

FOREIGN PATENT DOCUMENTS

| | | |
|---|---|---|
| EP | 1656919 A2 | 5/2006 |
| EP | 1736356 B1 | 4/2008 |

(Continued)

OTHER PUBLICATIONS

International Search Authority for the PCT (European Patent Office), International Search Report and Written Opinion for PCT/US2022/040337 dated Nov. 3, 2022.

(Continued)

*Primary Examiner* — Stephen T Gordon
(74) *Attorney, Agent, or Firm* — Daniel Tallitsch

(57) ABSTRACT

A wheelchair docking system including a frame having an upper portion and a lower portion, the upper portion being movable relative to the lower portion between a lowered position and a raised position. A coupler mechanism engages a wheelchair during a docking operation. The system also includes a first latching mechanism being movable between a retracted position and a latching position such that the first latching mechanism is spaced from the coupler mechanism. A second latching mechanism moves the upper portion of the frame between its lowered position and raised position. The first latching mechanism is partially retracted by a wheelchair during the docking operation, and the first latching mechanism is biased to its latching position when the coupler mechanism engages the wheelchair.

20 Claims, 14 Drawing Sheets

(58) Field of Classification Search
USPC .......................................... 410/7, 8, 9, 19, 22
See application file for complete search history.

(56) References Cited

U.S. PATENT DOCUMENTS

| | | |
|---|---|---|
| 9,333,129 B2 | 5/2016 | Cardona et al. |
| 2009/0214314 A1 | 8/2009 | Girardin et al. |
| 2011/0123286 A1* | 5/2011 | Van Roosmalen ...... A61G 3/08 410/7 |
| 2013/0280002 A1* | 10/2013 | Girardin .............. A61G 3/0808 410/7 |
| 2018/0347742 A1 | 12/2018 | Chinn et al. |
| 2021/0069038 A1 | 3/2021 | Wojdyla et al. |

FOREIGN PATENT DOCUMENTS

| | | |
|---|---|---|
| KR | 10-0439802 B1 | 7/2004 |
| WO | 2018184884 A1 | 10/2018 |

OTHER PUBLICATIONS

International search report and written opinion; Korean Intellectual Property Office; dated Sep. 28, 2020; 11 pages.

\* cited by examiner

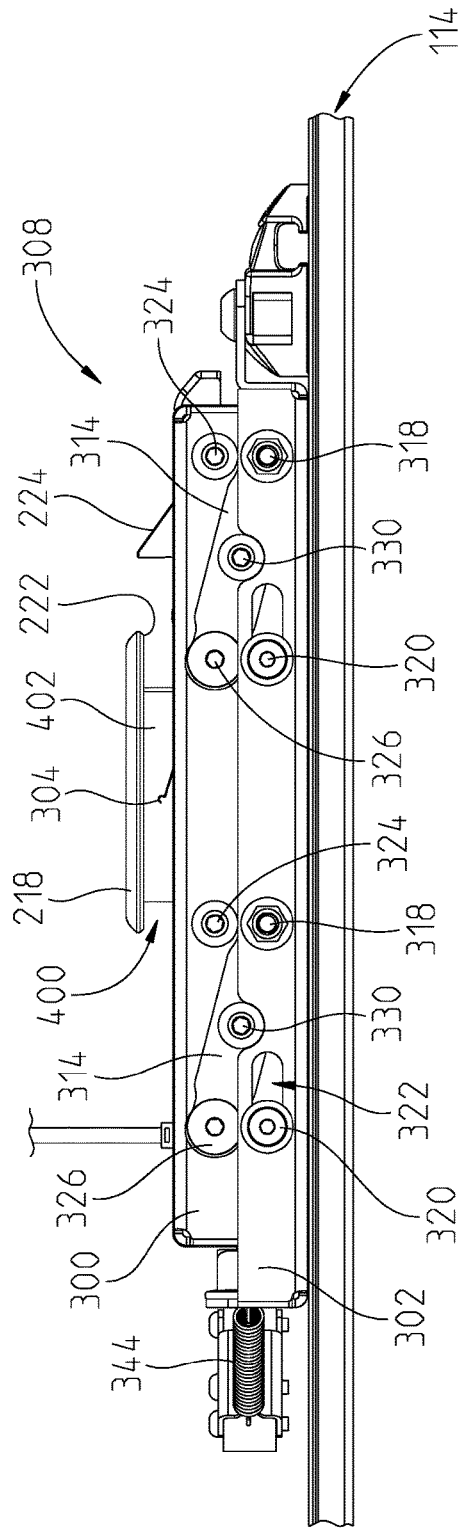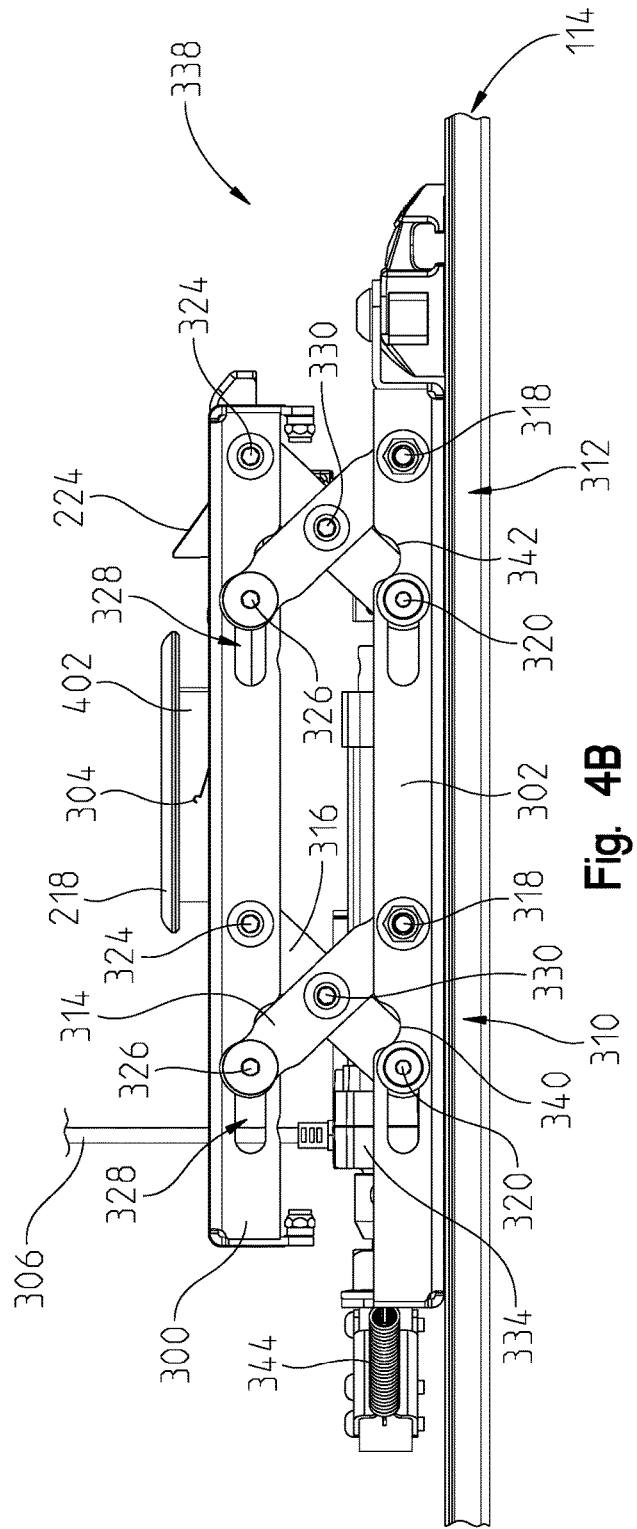

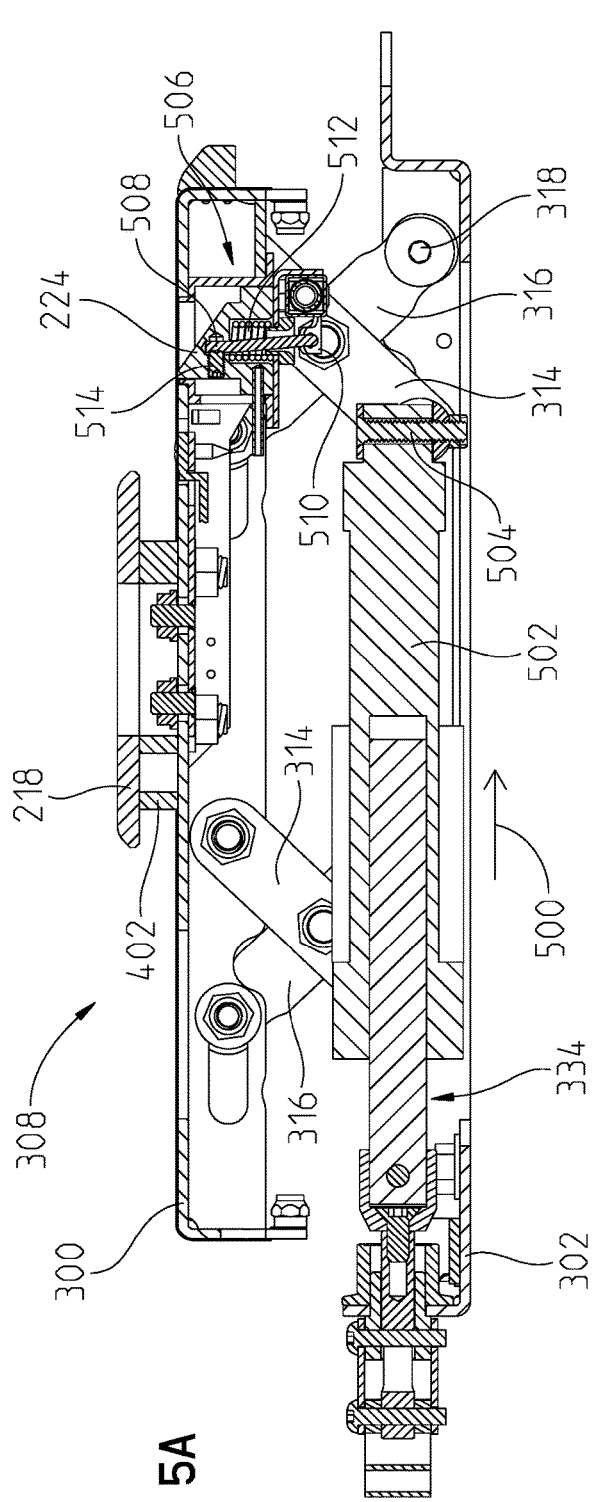
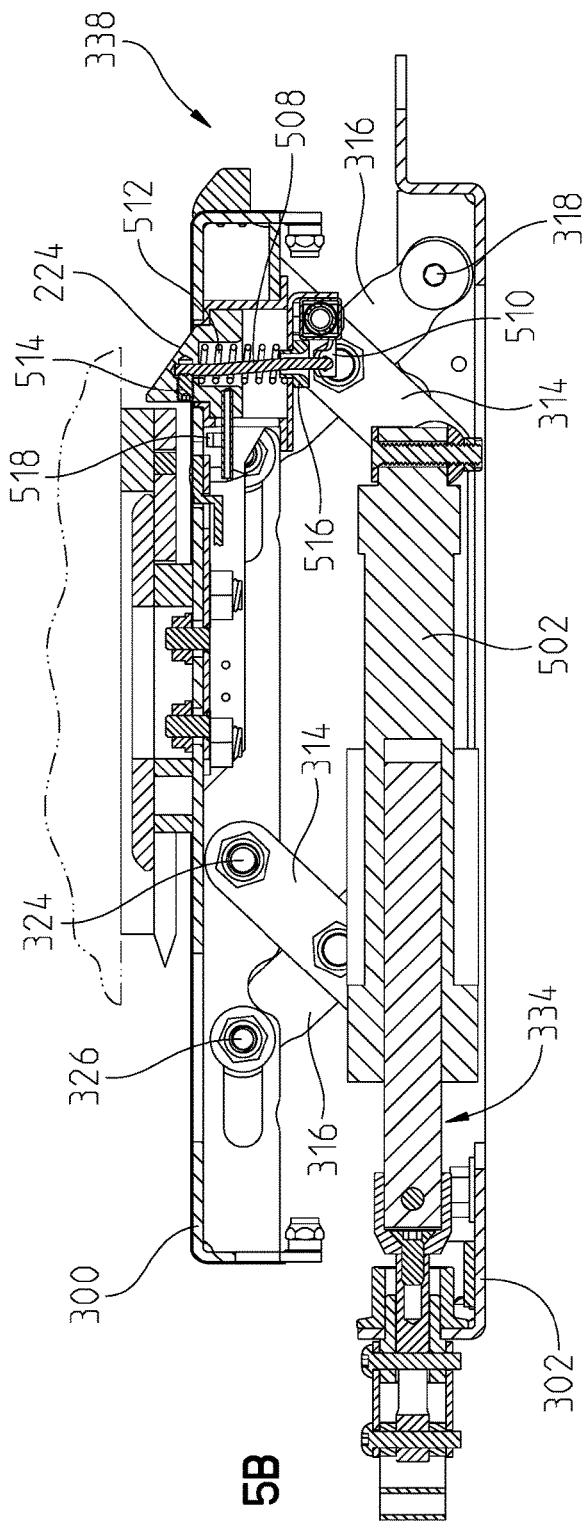
Fig. 5A
Fig. 5B

WHEELCHAIR DOCKING SYSTEM AND METHOD THEREOF

RELATED APPLICATIONS

The present disclosure claims the benefit of U.S. Provisional Patent Application Ser. No. 62/866,064, filed Jun. 25, 2019, entitled "Wheelchair Docking System and Method Thereof," the disclosure of which is hereby incorporated by reference in its entirety.

FIELD OF THE DISCLOSURE

The present application relates to a passenger vehicle for transporting one or more passengers, and more particularly to a docking system for releasably coupling a wheelchair to a floor in a vehicle.

BACKGROUND

Automobile manufacturers do not currently mass-produce passenger motor vehicles specifically designed to transport passengers having physical limitations, either as a driver or as a non-driving passenger. Consequently, mass-produced passenger vehicles are modified, or retrofitted, by a number of aftermarket companies dedicated to supplying vehicles to physically limited passengers. Such vehicles can be modified by removing certain parts or structures within a vehicle and replacing those parts with parts specifically designed to accommodate the physically limited passenger. For example, in one configuration, a van or bus is retrofitted with a ramp to enable a physically limited individual using a wheelchair to enter and exit the vehicle without the assistance of another individual.

Other known products for retrofitting a vehicle, such as a van, bus, sport-utility vehicle, or motor coach, include wheel chair lifts, lift platforms, and lowered floor surfaces. In some instances, a floor of an original equipment manufacturer (OEM) vehicle is lowered or otherwise modified to accommodate an entry and exit of the physically limited individual through a side door or entrance of the vehicle.

SUMMARY

In a first embodiment of the present disclosure, a wheelchair docking system for being coupled to a floor includes a frame having an upper portion and a lower portion, the upper portion being movable relative to the lower portion between a lowered position and a raised position; a coupler mechanism configured to engage a wheelchair during a docking operation, the coupler mechanism being positioned on the upper portion; a first latching mechanism being movable between a retracted position and a latching position, the first latching mechanism spaced from the coupler mechanism; and a second latching mechanism for moving the upper portion of the frame between its lowered position and raised position; wherein, the first latching mechanism is partially retracted by a wheelchair during the docking operation; wherein, the first latching mechanism is biased to its latching position when the coupler mechanism engages the wheelchair.

In a first example of this embodiment, the first latching mechanism is biased to its latching position by a spring. In a second example, the first latching mechanism comprises a locking pin. In a third example, an actuator is coupled to the locking pin, the actuator being operably actuated between an extended position and a retracted position to move the locking pin between its latching position and its retracted position.

In a fourth example, a first scissor assembly is operably coupled between the upper portion and the lower portion; and a second scissor assembly operable coupled between the upper portion and the lower portion, the second scissor assembly being spaced longitudinally from the first scissor assembly. In a fifth example, the first scissor assembly and the second scissor assembly each includes a first leg and a second leg, the first leg and second leg being coupled to one another via a connection pin. In a sixth example, the first leg is disposed outwardly of the second leg.

In a seventh example, the first leg is coupled to an external location of the upper portion and an internal location of the bottom portion; the second leg is coupled to an internal location of the upper and lower portions. In an eighth example, one end of the first leg is affixed to the lower portion and an opposite end is slidably coupled to the upper portion; one end of the second leg is affixed to the upper portion and an opposite end is slidably coupled to the lower portion. In a ninth example, the second leg of the first scissor assembly is coupled to the second leg of the second scissor assembly via a longitudinal member.

In a tenth example, the first or second scissor assembly is coupled to a cross member. In an eleventh example, an actuator is coupled to the cross member, the actuator being operably actuated between an extended position and a retracted position to move the cross member longitudinally; wherein, as the cross member moves longitudinally, the upper portion of the frame moves between its lowered position and raised position.

In another embodiment of the present disclosure, a wheelchair docking system for being coupled to a floor includes a frame having an upper portion and a lower portion, the upper portion being movable relative to the lower portion between a lowered position and a raised position; a coupler mechanism configured to engage a wheelchair during a docking operation, the coupler mechanism being positioned on the upper portion; a first latching mechanism being movable between a retracted position and a latching position, the first latching mechanism spaced from the coupler mechanism; a second latching mechanism for moving the upper portion of the frame between its lowered position and raised position; a first release mechanism for operably controlling movement of the first latching mechanism; and a second release mechanism for operably controlling the second latching mechanism to move the upper portion from its lowered position to its raised position.

In one example of this embodiment, an actuator is coupled to the first latching mechanism, the actuator being operably actuated between an extended position and a retracted position to move the first latching mechanism between its latching position and its retracted position. In a second example, the first release mechanism includes a user control for communicating with a controller, the controller operably actuating the actuator between its extended and retracted positions; a plate coupled to the first latching mechanism via a pin, the plate being coupled to the actuator; a spring for biasing the first latching mechanism to its latching position; wherein, upon receiving a command from the user control to enable the first release mechanism, the controller operably actuates the actuator which moves the plate for compressing the spring; wherein, as the spring compresses, the first latching mechanism moves from its latching position to its retracted position.

In another example, the first latching mechanism and the second latching mechanism comprise manually-operable cables. In a further example, the second release mechanism includes a cable operably coupled to a plate having a slot defined therein; a pin disposed within the slot for movement therein from a first position to a second position; an actuator for operably controlling the upper portion between its lowered position and its raised position, the actuator comprising a rod operably coupled to the pin; wherein, in the lowered position, the pin is disposed at a first end of the slot and the actuator is in a retracted position; wherein, as the cable is pulled, the pin moves from the first end to a second end of the slot, where movement of the pin from the first end to the second end induces the rod to extend in a longitudinal direction; further wherein, movement of the rod in the longitudinal direction induces the upper portion to move from its lowered position to its raised position.

In yet another example, the system includes a first scissor assembly operably coupled between the upper portion and the lower portion; and a second scissor assembly operable coupled between the upper portion and the lower portion, the second scissor assembly being spaced longitudinally from the first scissor assembly; wherein, as the actuator moves from its retracted position to an extended position, the first and second scissor assemblies induce the movement of the upper portion from its lowered position to its raised position.

In a further embodiment of the present disclosure, a wheelchair docking system for being coupled to a floor includes a frame having an upper portion and a lower portion, the upper portion being movable relative to the lower portion between a lowered position and a raised position; a coupler mechanism configured to engage a wheelchair during a docking operation, the coupler mechanism being positioned on the upper portion; a first latching mechanism being movable between a retracted position and a latching position, the first latching mechanism spaced from the coupler mechanism; a second latching mechanism for moving the upper portion of the frame between its lowered position and raised position; a first tether assembly comprising a first tether strap coupled at one end to the lower portion and at an opposite end to the upper portion, the first tether assembly positioned at a rear end of the frame; and a second tether assembly comprising a second tether strap coupled at one end to the lower portion and at an opposite end to the upper portion, the second tether assembly positioned at a front end of the frame.

In an example of this embodiment, the system may include a bracket mounted to the lower portion of the frame; and a pin coupled to the mounting bracket; wherein, the first tether strap is coupled to the pin at the one end.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein:

FIG. 4A is a side view of the wheelchair docking system in the first configuration of FIG. 3A;

FIG. 4B is a side view of the wheelchair docking system in the second configuration of FIG. 3B;

FIG. 5A is a side cross-sectional view of the wheelchair docking system in the second configuration;

FIG. 5B is another side cross-sectional view of the wheelchair docking system in the second configuration;

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Figure 1:
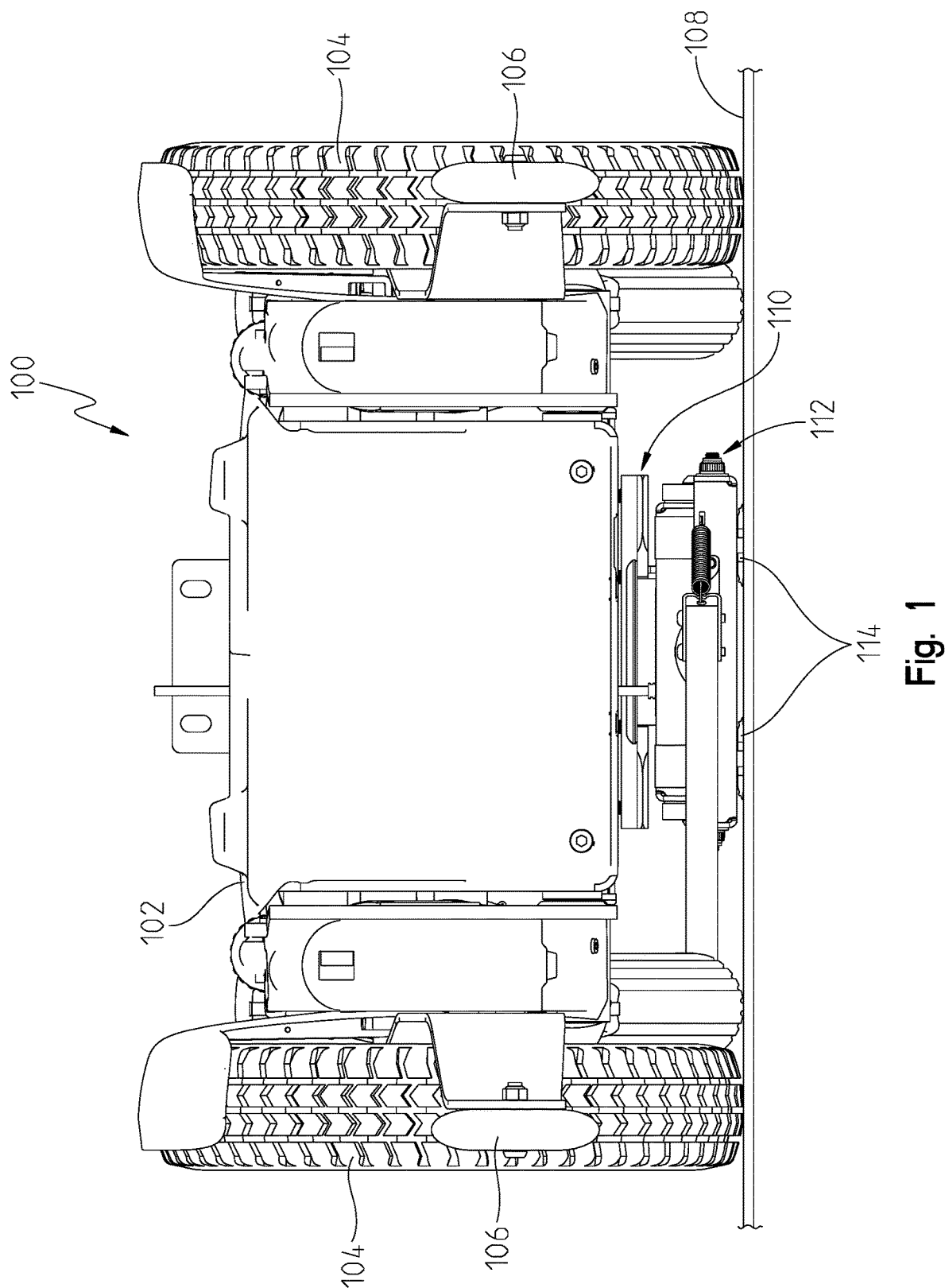
FIG. 1 is a front view of a powered wheelchair and docking system in a passenger vehicle.

Referring to FIG. 1 of the present disclosure, a wheelchair 100 is depicted. The wheelchair 100 may include a frame 102 supported by one or more wheels 104. A brake or anti-tilt/tip mechanism 106 may be located at one or more wheels 104 for slowing down or keeping the wheels 104 from turning, if necessary. The wheelchair 100 may be a powered wheelchair or a manually-operated wheelchair. Any type of wheelchair 100 is applicable to the present disclosure.

In FIG. 1, the wheelchair 100 is shown located in an interior of a vehicle which has a vehicle floor 108. The vehicle floor 108 may be the original OEM vehicle floor, or it may be a modified vehicle floor to accommodate a ramp or wheelchair lift assembly. In any event, the wheelchair 100 may be maneuvered such that the physically limited individual operating or positioned in the wheelchair may be positioned in any location of the vehicle, including at the driver's position of the vehicle.

In conventional vehicle arrangements, a physically limited individual may drive the vehicle so long as the wheelchair is properly latched or connected to the vehicle floor in at least one or two manners. Most conventional wheelchairs therefore are designed to include a bolt or other bolt-like feature connected to a bottom of the chair and protruding downward toward the floor. The bolt may then be received by a conventional docking system which is bolted through to the floor. The conventional docking system has a mechanism which receives and latches to the bolt, thereby holding the wheelchair to the vehicle floor. Additional mechanisms may be used to further support and fasten the wheelchair to the vehicle floor.

The conventional wheelchair, however, presents many problems. First, the bolt protrudes downwardly from the wheelchair and leaves very little clearance between the floor and the bolt. Thus, the bolt can often contact objects and the like that the wheelchair would otherwise clear. When the bolt does contact an object, it can cause the wheelchair to tip forward or rearward, or become obstructed with. Alternatively, the object may be dragged by the bolt until it can be cleared from underneath the wheelchair. In either case, it is disadvantageous to have a bolt protruding downwardly from the wheelchair and reducing the clearance between the wheelchair and floor.

In the present disclosure, an improved docking system 112 allows for the wheelchair 100 to have greater clearance between it and the floor 108. Moreover, the docking system 112 includes a first latching mechanism for coupling to a coupling device 110 on the wheelchair 100, and a second latching mechanism for coupling the wheelchair 100 to the vehicle floor 108 and preventing it from tilting to the left or right as the vehicle makes a turn. Thus, the present disclosure provides a better connection between the wheelchair 100 and the vehicle floor 108, and one which is safer over conventional docking systems. Further, the present disclosure provides a track system 114 which allows the docking system 112 to be adjusted longitudinally along the vehicle floor 108 for different sized passengers.

Figure 2:
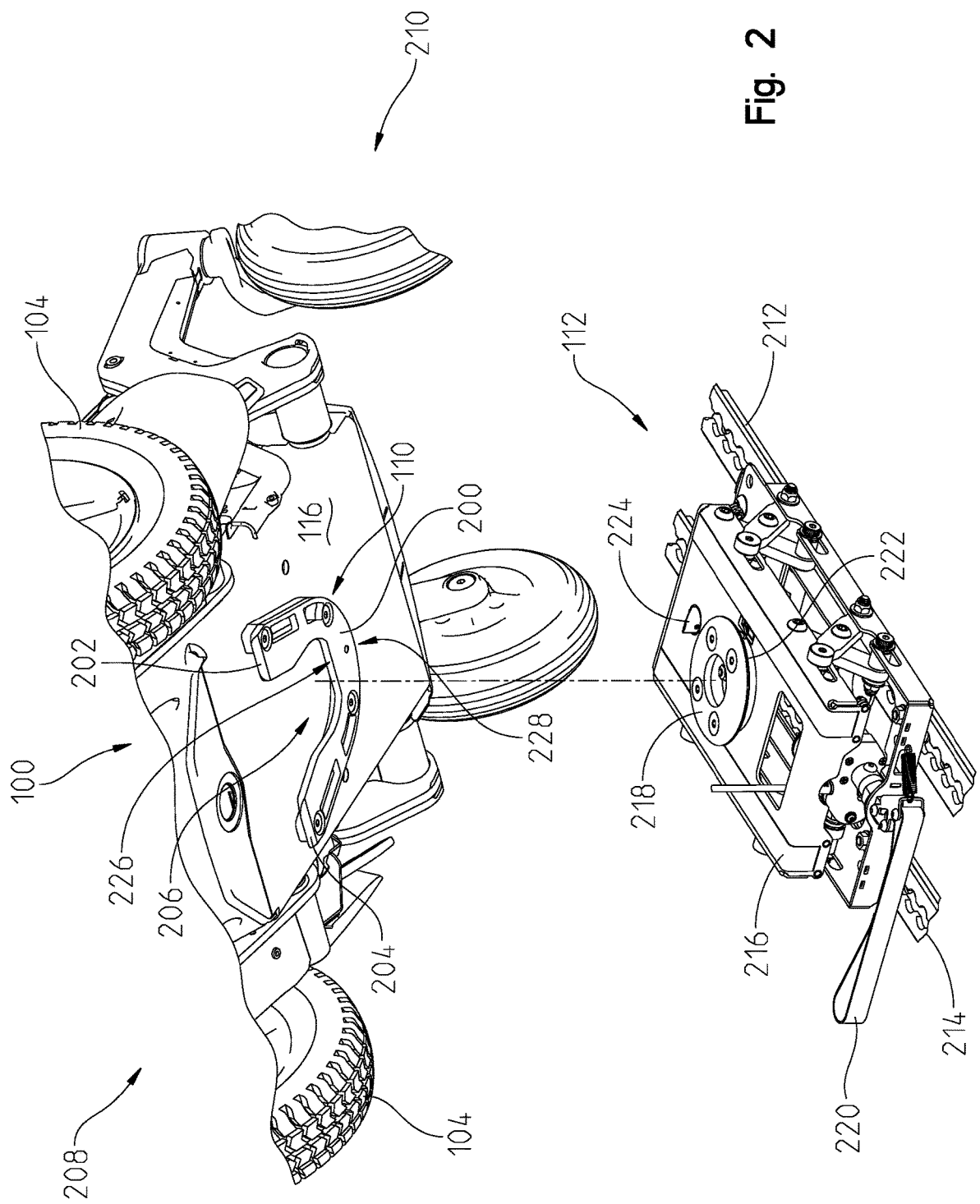
FIG. 2 is a partial exploded and perspective view of the wheelchair and docking system of FIG. 1.

In FIG. 2, for example, the bottom portion of the wheelchair 100 is better shown. Here, the wheelchair 100 has a bottom surface 116 to which the coupling device 110 is connected via one or more fasteners. The coupling device 110 may be a substantially U-shaped bracket 200 formed by a first leg 202 and a second leg 204. The first and second legs are spaced from one another to define an opening 206 therebetween. In FIG. 2, the opening 206 is oriented towards a front end 208 of the wheelchair 100 rather than a rear end 210.

The opening 206 in the bracket 200 is configured to engage with the docking system 112. The docking system 112 may include a frame 216 and a coupler mechanism 218 as shown in FIG. 2. The coupler mechanism 218 may comprise a neck portion 402 (FIG. 4) that extends upwardly from the frame 216 and terminates at a disk-shaped top portion 222. As the wheelchair 100 is moved into engagement with the docking system 212, the bracket 200 comes into contact with the coupler mechanism 218. In particular, the coupler mechanism 218 is received within the opening 206 of the coupling device 110, and the first leg 202 and second leg 204 are received within a space 400 (FIG. 4A-B) defined between the frame 216 of the docking system 112 and the disk-shaped top portion 222 of the coupler mechanism 218. In the engaged position, the first leg 202 and second leg 204 may be in close proximity or contact with the neck portion 402 of the coupler mechanism 218.

To maintain the wheelchair 100 engaged with the docking system 112, the docking system 112 may further include a retractable locking pin 224. The locking pin 224 may have an angled surface which comes into contact with a first surface 226 of the bracket 200 causing the locking pin 224 to be pushed downwardly into an opening. Once the bracket 200 clears the locking pin 224, a spring 512 (FIG. 5) may bias the locking pin 224 to its upward position of FIG. 2. In the upward position, the bracket 200 is retained between the coupler mechanism 218 and the locking pin 224. This connection between the wheelchair 100 and docking system 112 may establish a first of at least two latching mechanisms of the present disclosure.

The aforementioned track system 114 of the present disclosure is also shown in FIG. 2. Here, the track system 114 may include a first track 212 and a second track 214. The docking system 112 may be movably coupled to the first and second tracks, which is shown in greater detail in FIGS. 9 and 10.

Figure 9:
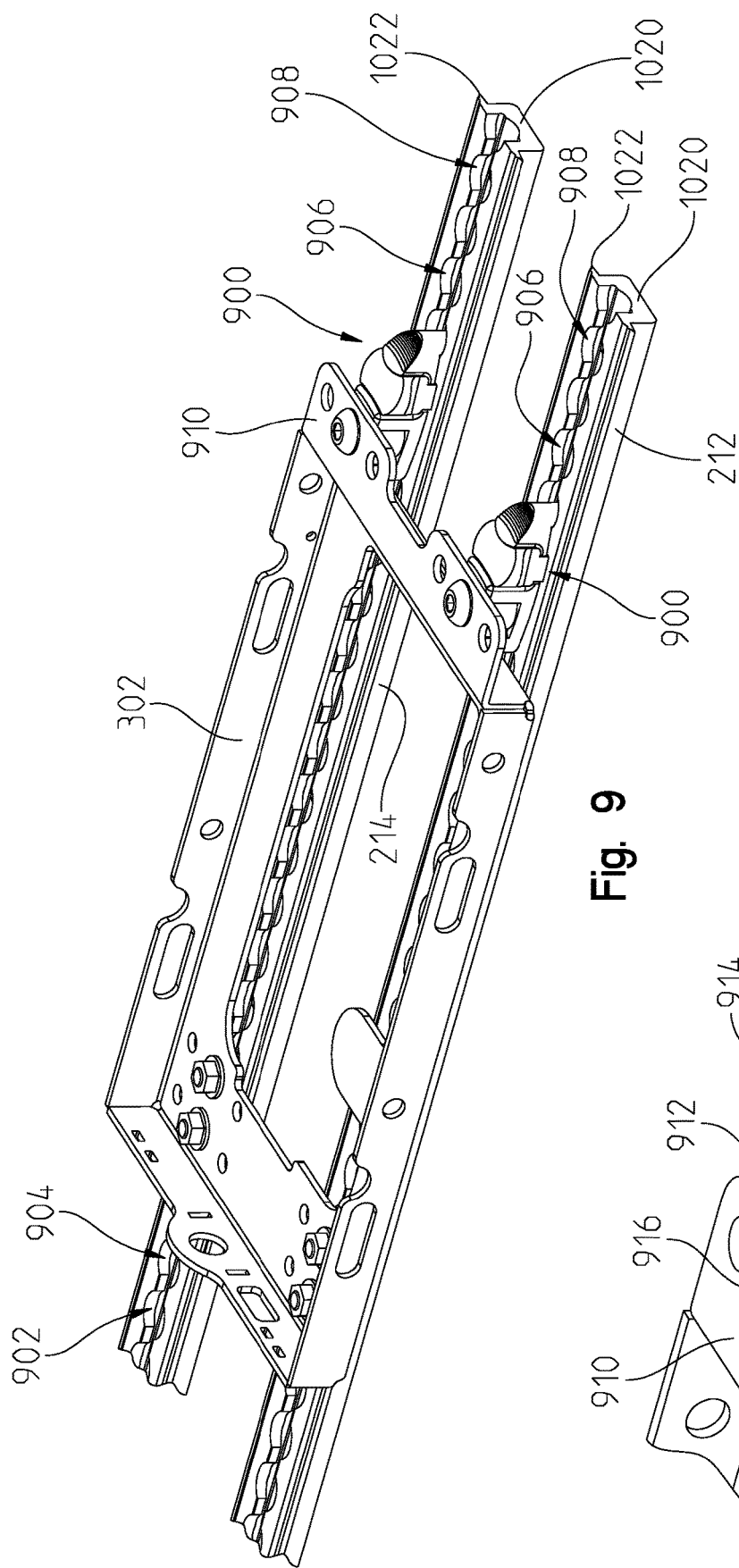
FIG. 9 is a partial perspective view of a portion of the wheelchair docking system and track system.

In FIG. 9, for example, a lower portion 302 of the frame 216 of the docking system 112 is shown. Here, a flange 910 may protrude rearwardly from the lower portion 302 as shown. The docking system 112 spans the a gap defined between the first track 212 and second track 214. In some instances, the gap therebetween may be different or adjustable depending upon the vehicle. Thus, to accommodate different gaps between the first and second tracks, the flange 910 may include a plurality of openings 1004 (FIG. 10) to adjustably couple the docking system 112 to the track system 114.

The docking system 112 may include a bottom plate or panel 1006 which define a plurality of openings 1008 therein as well. The plurality of openings 1008 are also to accommodate different gaps between the first and second tracks.

Figure 10:
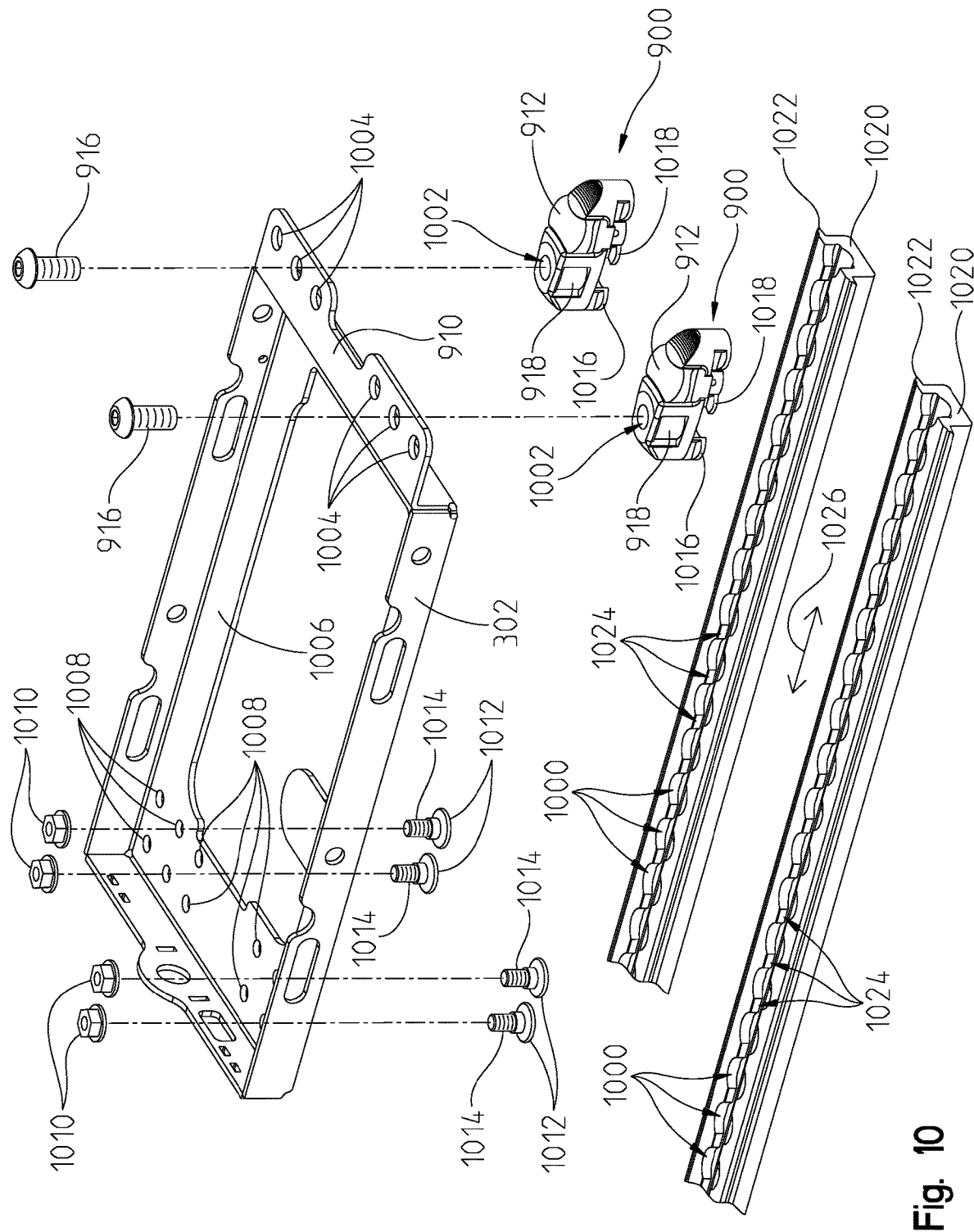
FIG. 10 is a partial exploded perspective view of the portion of the wheelchair docking system and track system of FIG. 9A.

Each of the tracks may include a body that has a bottom portion 1020 and a top portion 1022. The top portion 1022 may have an outer lip that extends outwardly on both sides, as shown in FIG. 10. Moreover, each track defines a plurality of receptacles 1000 configured to receive the docking system 112. In FIG. 9, for example, the plurality of receptacles 1000 may include a first receptacle 902, a second receptacle 904, a third receptacle 906, a fourth receptacle 908, and so forth. Each of the plurality of receptacles 1000 is equally spaced from an adjacent receptacle along each longitudinal track. Further, a narrower channel 1024 connects each adjacent receptacle to another receptacle, as shown in FIG. 10. The channel 1024 may extend from a first end of each track 212, 214 to an opposite end thereof.

Figure 9A:
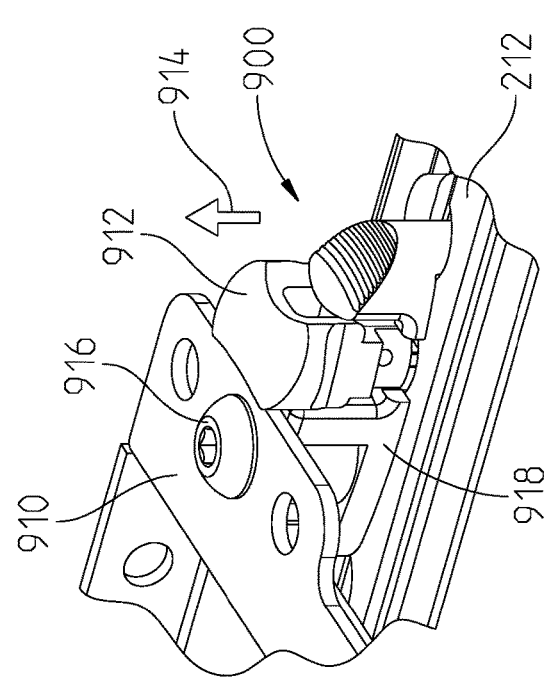
FIG. 9A is a partial perspective view of a release mechanism for adjusting the wheelchair docking system relative to the track system.

The docking system 112 may be movably coupled to the track system 114 via an adjustable latch 900. In FIGS. 9 and 9A, the adjustable latch 900 may include a body 918 that defines an opening 1002 for receiving a fastener 916. In FIG. 10, the fastener 916 may fit through one of the plurality of openings 1004 in the flange 910 and further coupled to the body 918. For instance, the body 918 may include internal threads to which the fastener 916 may be coupled. The fastener 916 may couple to the body 918 in any conventional manner.

The adjustable latch 900 may include a tab portion 912 which may be slidable in an upward direction 914 as shown in FIG. 9A. As the tab portion 912 is moved in the upward direction 914, it may be released from being disposed in one of the plurality of receptacles 1000. As a result, the adjustable latch 900 can be used to move the docking system 112 in a longitudinal direction 1026 relative to the track system 114. Moreover, as the docking system 112 is moved, a first post 1016 and a second post 1018 on each adjustable latch 900 may slide through the narrow channel 1024 until the tab 912 is repositioned in a different receptacle.

The adjustable latch 900 may be located on the rear of the docking system 112. At the front of the docking system, a pair of retaining pins may be engaged with the first track 212 and second track 214. Each retaining pin may include a neck portion 1014 and a retaining end 1012. A nut 1010 or other fastener may be threadedly coupled to the neck portion 1014 of each retaining pin. Thus, the retaining pin is coupled to the bottom panel 1006 of the docking system. The retaining pin, unlike the adjustable latch 900, remain coupled to the docking system and may slide in the longitudinal direction 1026 through the channel 1024 as the docking system 112 is adjusted.

Figure 3A:
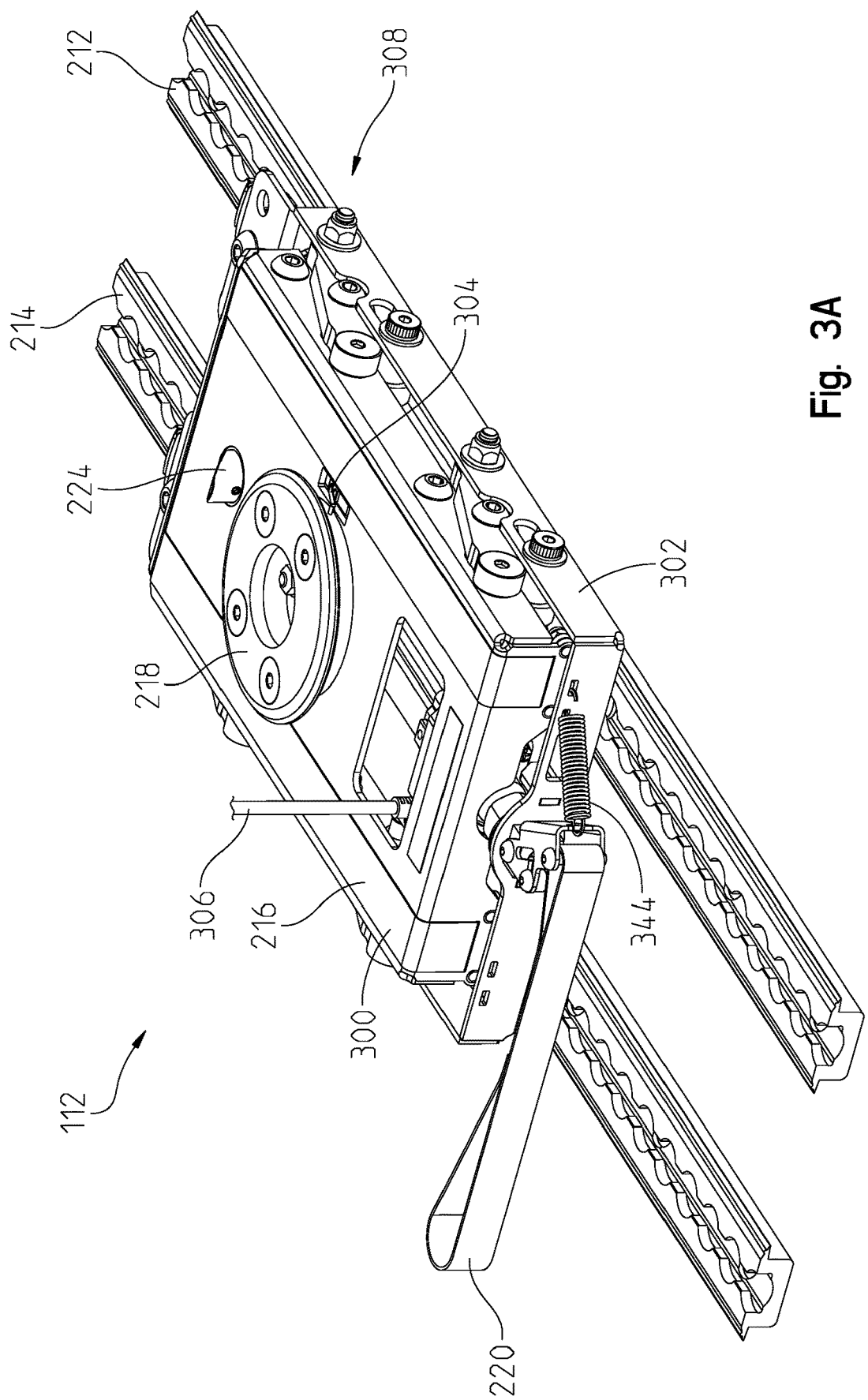
FIG. 3A is a perspective view of a wheelchair docking system and track system for a passenger vehicle in a first configuration.

Referring now to FIG. 3A, the docking system 112 is shown coupled to the track system 114. The docking system 112 may include a top portion 300 and a bottom portion 302. The bottom portion 302 has been described with respect to FIGS. 9-10 above and include the bottom panel 1006 and flange 910. The top portion 300 forms part of the frame 216 to which the coupler mechanism 218 and locking pin 224 are connected. In FIG. 3A, the docking system 112 is shown in its lowered position 308, whereas in FIG. 3B the docking system 112 is in its raised position 338. The docking system 112 is in its raised position 338 when it is not engaged with the wheelchair 100.

The docking system 112 includes a switch 304 for detecting the presence of the bracket 200 and wheelchair 100. A wire or other means may electrically couple the switch 304 to a controller 1102 (FIG. 11) for communicating with the driver or physically limited individual that the bracket 200 is coupled to the docking system 112. For instance, the controller 1102 or a control system 1100 may receive a signal from the switch 304 and display a signal or illuminate a light on a dashboard 1112 of the vehicle indicating the connection.

Figure 3B:
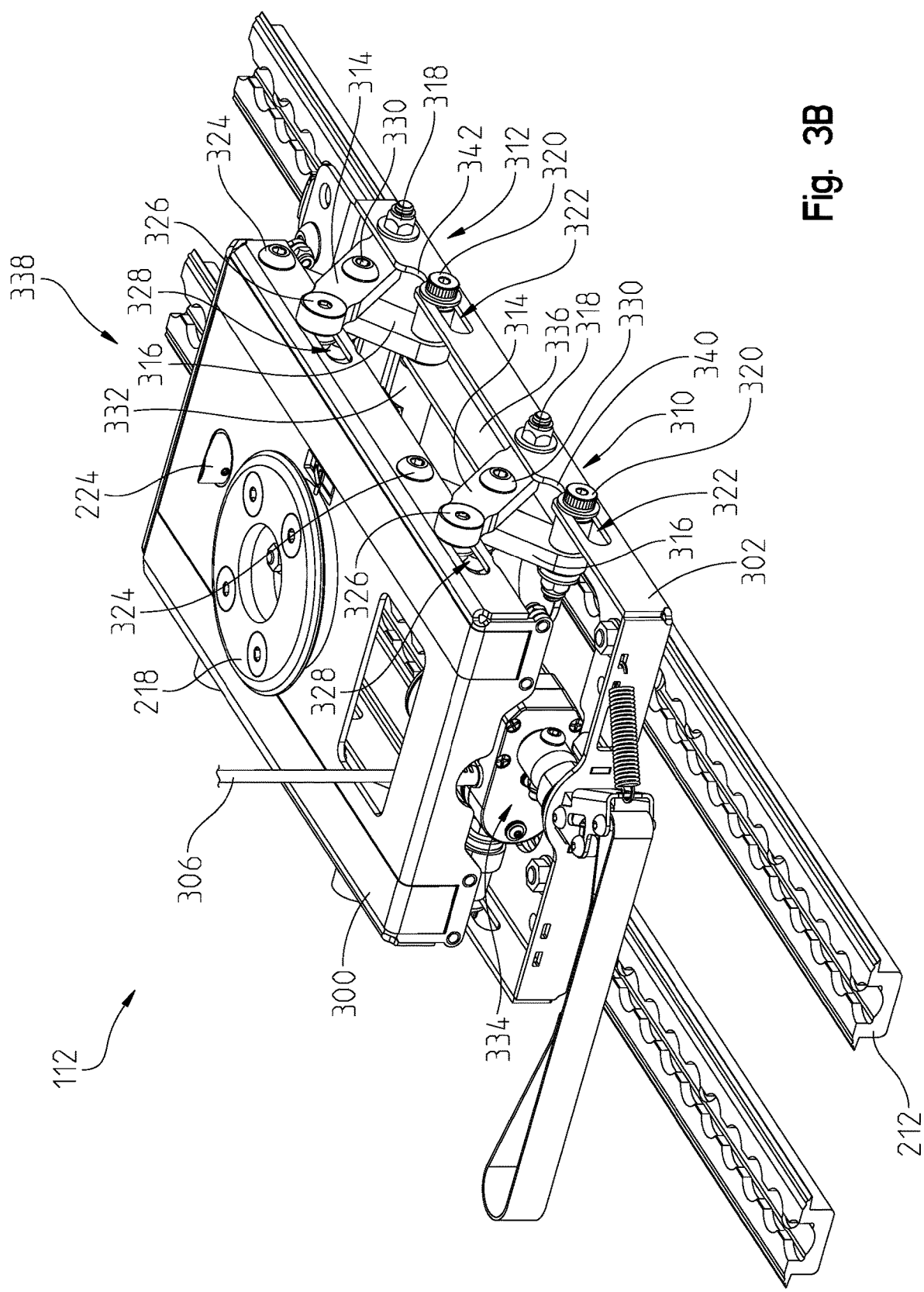
FIG. 3B is a perspective view of a wheelchair docking system and track system for a passenger vehicle in a second configuration.

A second wire or cable 306 is shown in FIG. 3A. This wire or cable 306 may be coupled to a first actuator 334 as shown in FIG. 3B. A control button 1108 located in the vehicle may be electrically coupled to the actuator 334 via the wire or cable 306. Alternatively, the controller 1102 or control system 1100 may automatically communicate with the actuator 334 to trigger it between an extended and retracted position. The actuator 334 forms part of the second latching mechanism of the present disclosure.

When the sensor 304 detects that the wheelchair is engaged by the coupler mechanism 218 and locking pin 224, it may send a signal to a controller 1102 to automatically trigger the actuator 334. Alternatively, the signal may be displayed on a dashboard 1112 or display screen 1110 in the cab of the vehicle, and the operator may manually trigger the actuator 334. As the actuator 334 extends and retracts, the top portion 300 may move upwards or downwards relative to the lower or bottom portion 302. In other words, the actuator 334 may control the movement of the docking system 112 between its raised position 338 of FIG. 3B and its lowered position 308 of FIG. 3A.

The manner in which the docking system 112 moves between its raised and lowered positions will now be described. The docking system 112 may include a front scissor assembly 310 on a front end thereof and a rear scissor assembly 312 on a rear side thereof. Moreover, there may be a front scissor assembly 310 and rear scissor assembly 312 on both the left and right sides of the docking system 112. The front scissor assembly 310 and rear scissor assembly 312 may include a pair of legs. For example, each assembly may include a first leg 314 and a second leg 316. The first leg 314 may be disposed outwardly of the second leg 316. Moreover, the first leg 314 may be coupled to an outside location of the top portion 300 of the docking system 112 and an inside location of the bottom portion 302. The second leg 316 may be coupled at an inside location of the top and bottom portions of the docking system 112, as shown in FIG. 3B.

The first leg 314 and second leg 316 may be coupled at an approximate midpoint along the length of each leg. In FIG. 3B, for example, the first leg 314 and second leg 316 may be pivotally coupled via a connection pin 330 or fastener. The first leg 314 and second leg 316 can therefore pivot relative to one another about an axis defined by the connection pin 330. This is the only coupling point between the first and second legs.

The first leg 314 may be fixedly coupled at one end thereof to the bottom portion 302 of the docking system 112 via a fastener 318. Thus, the first leg 314 cannot move laterally relative to the bottom portion 302 at this location. At an opposite end, the first leg 314 may be movably coupled to the top portion 300 via a pin 326. Here, the pin 326 can move within a longitudinal slot 328 defined in the top portion 300 of the docking system 112. Thus, as the actuator 334 extends and retracts, the first leg 314 remains fixed at one end to the bottom portion 302 via the fastener 318 but moves longitudinally in the slot 328 at an opposite end thereof.

Similarly, the second leg 316 includes two ends. At a first end, the second leg 316 is fixedly coupled to the top portion 300 via a fastener 326. At an opposite second end, the second leg 316 is movably coupled to the bottom portion 302 via a pin 320. The pin 320 is able to move longitudinally within a longitudinal slot 322 defined in the bottom portion 302.

The above-described first and second legs of the front scissor assembly 310 is equally applicable to the front scissor assembly 310 on the opposite side of the docking system 112 as shown in FIG. 3B. Moreover, the rear scissor assembly 312 functions in the same manner. Thus, for sake of brevity, the manner in which the rear scissor assembly 312 operates will not be described.

Figure 7:
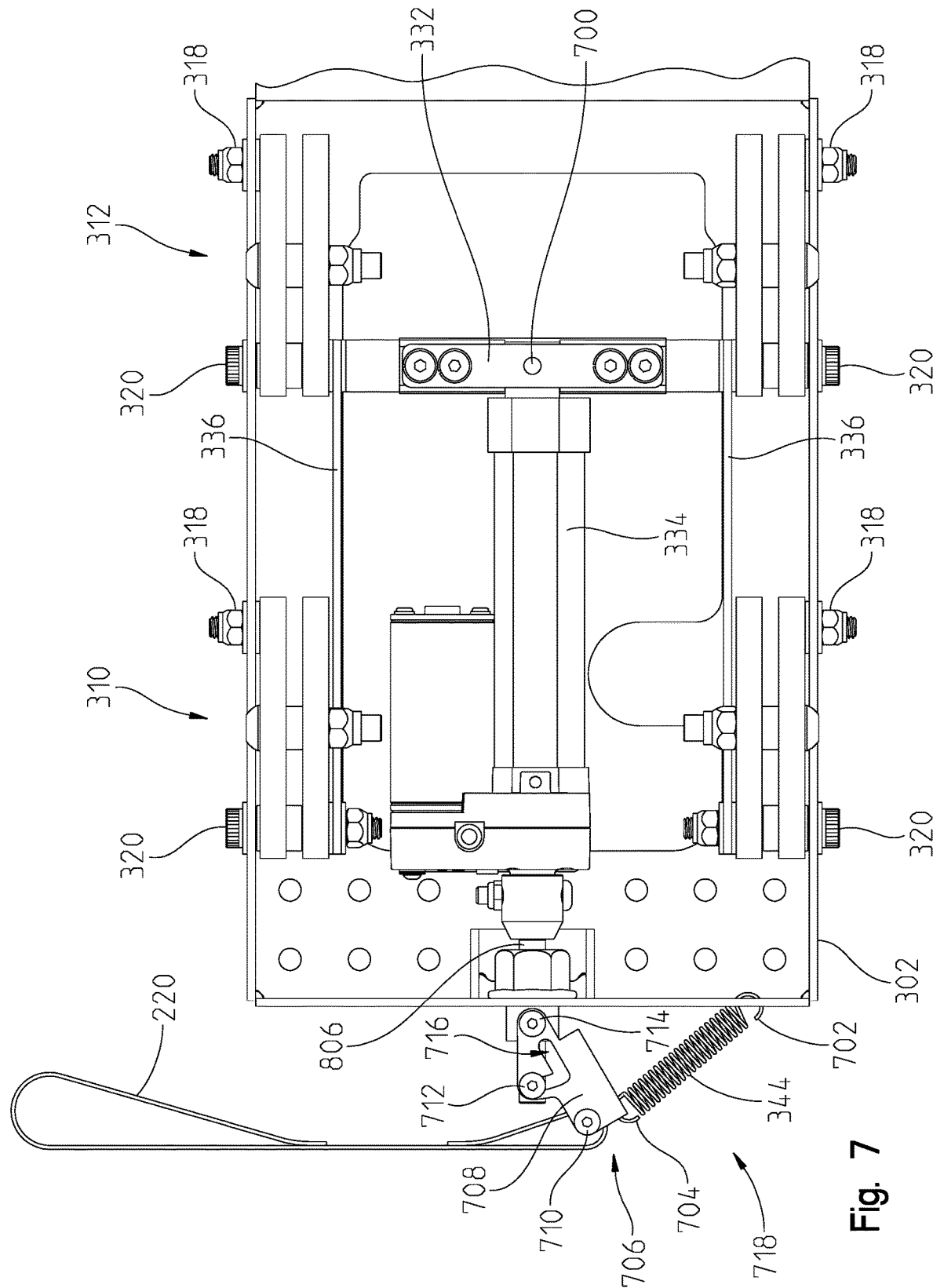
FIG. 7 is a bottom view of the wheelchair docking system.

The rear scissor assembly 312 is also coupled to a cross member 332 as shown in FIG. 3B. In particular, the cross member 332 extends the width of the docking system 112 and is coupled to the pins 320 and second leg 316. Moreover, the cross member 332 may be coupled to the actuator 334 via a connector 700 (FIG. 7). In FIG. 5A, for example, the connector 700 is shown as a bolt 504 that couples a rod 502 of the actuator 334 to the cross member 332. As the actuator 334 extends and retracts, the cross member 332 may move longitudinally. Since the cross member 332 is coupled to the second legs 316, movement of the cross member 332 in a longitudinal direction 500 (FIG. 5) via the actuator 334 may in turn induce the second legs 316 to move longitudinally within the longitudinal slots 322.

The second leg 316 of the rear scissor assembly 312 may be coupled to the second leg 316 of the front scissor assembly 310 via a longitudinal member 336. Thus, longitudinal movement of the second leg 316 of the rear scissor assembly 312 is in turn translated into longitudinal movement in the same direction of the second leg 316 of the front scissor assembly 310. As a result, the docking system 112 is capable of moving between its raised position 338 and lowered position 308 via actuation of the first actuator 334.

The bottom portion 302 of the docking system 112 may include a first recess 340 and a second recess 342 for receiving the connection pin 330 of the front and rear scissor assemblies in the lowered position 308.

Once the docking system 112 is in its lowered position 308, it is better able to maintain the wheelchair 100 from rocking or tilting as the vehicle is making a turn. The locking pin 224 provides a first latching mechanism to connect the wheelchair 100 to the docking system 112, and the actuation of the docking system 112 to its lowered position functions as a second latching mechanism for holding the wheelchair 100 more securely during vehicle operation.

While the first and second latching mechanisms are able to securely couple the wheelchair 100 to the vehicle floor 108, there may be an instance where it is desirable to manually release the latching mechanisms. For example, if the vehicle is involved in an accident or there is an emergency, it may be necessary to unlatch the chair from the floor. Alternatively, if the vehicle loses electrical power, it may be necessary to manually release the wheelchair from the docking system 112. To do so, there are two release systems in place for this.

Figure 6:
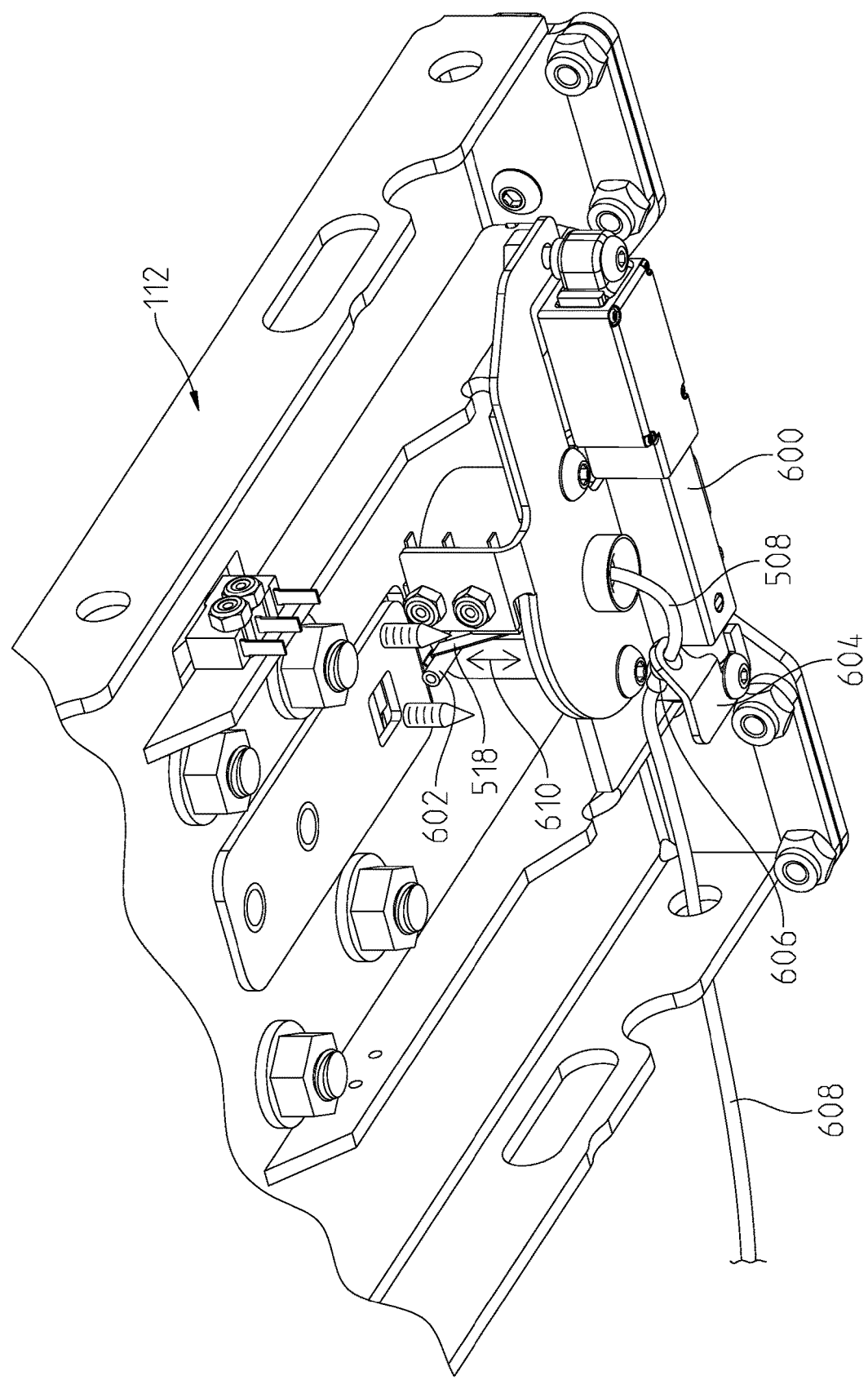
FIG. 6 is a partial bottom perspective view of the wheelchair docking system.

In FIGS. 5A, 5B, and 6, for example, a first of the release systems is depicted. Here, a first release mechanism 506 is shown for releasing the locking pin 224 and allowing the wheelchair to move away from the docking system 112. Before describing this release mechanism 506, however, it is necessary to point out that in FIG. 6 that a second actuator 600 is provided for moving the locking pin 224 between its upward and downward positions. The second actuator 600 may be controlled by a controller 1102 such as the vehicle controller 1114 or any other controller. In one example, a controller 1102 for only controlling the docking system 112 may be provided. In this instance, the controller 1102 may be in communication with the vehicle controller 1114 and/or any other controller of the vehicle (e.g., transmission controller 1118, engine controller 1116, etc.) over a communication link such as CAN, J-1939, etc.

The second actuator 600 may be coupled to a plate 604 as shown in FIG. 6. As the actuator 600 is actuated between an extended and retracted position, it induces movement of the plate 604. As the plate 604 is moved, it is coupled to the locking pin 224 via a pin 602 to move it in a downward position to compress a spring 512. The actuator 600 may provide sufficient force to the plate 604 to compress the spring 512 and move the locking pin to a retracted position such as shown in FIG. 5A. As the actuator 600 returns to a normal position, the spring 512 may bias the locking pin 224 to its upright position of FIG. 5B. Thus, control of the second actuator 600 allows for releasing the locking pin 224 when desired. Moreover, the locking pin 224 and pin 602 may move in a direction indicated by arrow 610 in FIG. 6.

In some instances, a button or other control 1108 may be in the vehicle to allow the wheelchaired passenger or other individual to control the actuator 600. The button or control 1108 may be manually triggered, which sends a signal to a controller 1102 which in turn commands the actuator 600 to actuate between its extended and retracted positions. As described above, an alternative embodiment would be for the controller 1102 to automatically detect a condition to release the locking pin 224. The controller 1102 may include logic, software, or an algorithm to operate from for actuating the first and second actuators of the present disclosure.

The first release mechanism 506 may include a cable or cord 608 of which a user may pull to retract the locking pin 224 from its latched position of FIG. 5B. The cable or cord 608 may be coupled to a cable 508 as shown in FIG. 5A, and one end of the cable 508 may be coupled to the locking pin 224 via a set screw 514 or other fastener. Thus, movement of the cable 508 induces the locking pin 224 to move downward and compress the spring 512.

The cable 508 passes through a ferrule 516 as shown in FIG. 5B. A bracket 510 is further coupled to the cable 508. The bracket 510 may be similar to or the same as the plate 604. A ball 606 or other feature may be coupled to the cord 608 and rests against the plate 604 as shown in FIG. 6. As a user pulls on the cord 608, it in turn pulls the cable 508 and locking pin 224 downwardly until the locking pin 224 is in the position shown in FIG. 5A.

A sensor 518 may be provided for detecting a position of the locking pin 224 and communicate this to a controller 1102 or display the position on a dashboard 1112 or other display 1110 in the vehicle. Thus, the operator and/or wheelchaired passenger will know the position of the locking pin 224 based on the detection made by the sensor 518.

Figure 8:
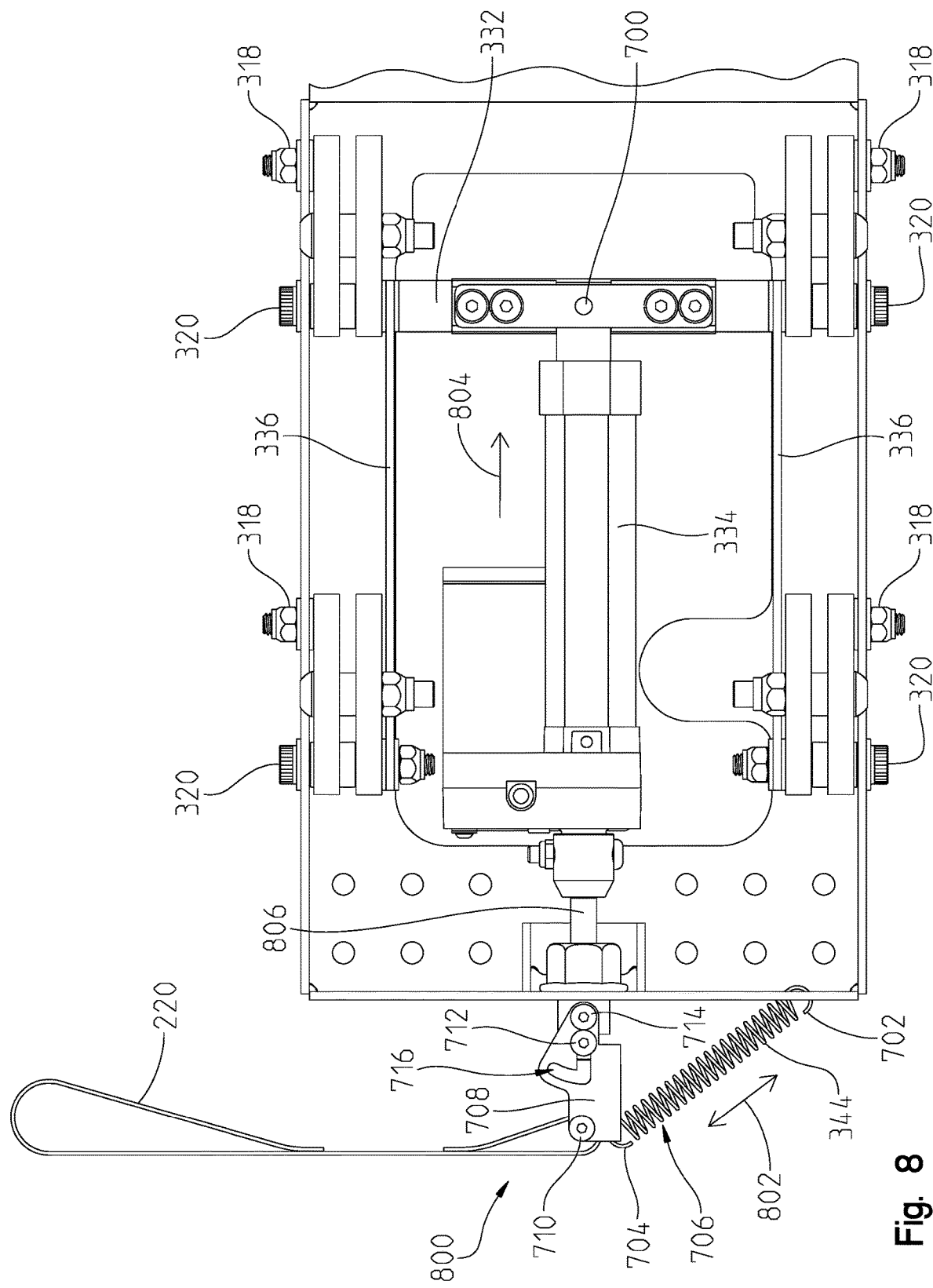
FIG. 8 is another bottom view of the wheelchair docking system.

The release mechanism 506 is useful to release the locking pin 224 and allow the wheelchair to be disengaged from the docking system 112. In FIGS. 7 and 8, a second release mechanism 706 is shown for raising the docking system 112 from its lowered position 308 to its raised position 338. Here, the second release mechanism 706 may include a safety strap or cable 220 that is coupled to a plate 708 via a fastener 710.

A spring 344 may be coupled between the plate 708 and the bottom portion 302 of the docking system 112. In particular, the spring 344 may include a first hook end 702 coupled to the bottom portion 302 and a second hook end 704 coupled to the plate 708.

The plate 708 may further be coupled to the docking system 112 via a first connector 714. In addition, the plate 708 may include an L-shaped slot 716 defined therein. A pin 712 may slide or otherwise move within the slot 716. The pin 712 may be coupled to a rod 806 of the first actuator 334 as shown in FIGS. 7 and 8. As the pin 712 moves within the slot 716, the rod 806 may extend or retract.

For example, in FIG. 7, the docking system 112 may be in its lowered position 308. The spring 344 is in its free, extended or uncompressed position 718. The pin 712 is located at a first end of the slot 716 and the actuator rod 806 is in its retracted position. In FIG. 8, however, the strap or cable 220 may be pulled to achieve a release configuration 800 thereby causing the pin 712 to move within the slot 716 to an opposite end thereof. As it does, the spring 344 is extended along direction 802. Moreover, as the pin 712 moves to the opposite end of the slot 716, the pin 712 induces the rod 806 to extend along direction 804 in FIG. 8. In doing so, the first and second scissor assemblies may raise the docking system 112 an amount equivalent to the length of the slot to relieve down pressure. Thus, in one example, the second release mechanism 706 is capable of transferring the docking system 112 from its lowered position 308 to its raised position 338. Stated another way, a clamping force on the docking system 112 is in effect relieved. In combination with the first release mechanism 506, the wheelchair 100 may be manually disengaged and released from the docking system 112 as necessary.

Figure 11:
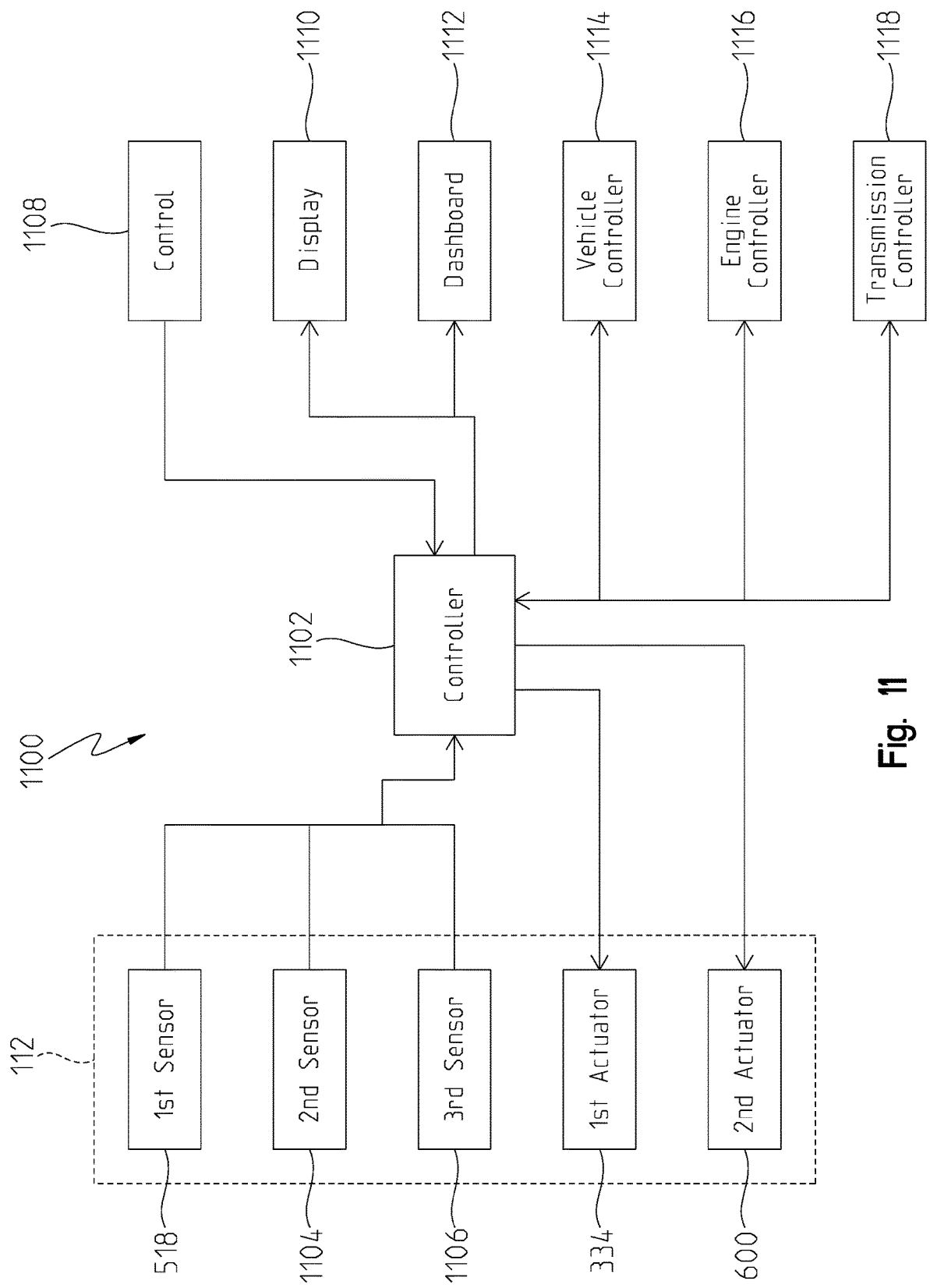
FIG. 11 is a diagram of a control system for controlling the docking system.

Referring to FIG. 11, which has been intermittently alluded to in the above description, a control system 1100 for controlling the docking system 112 and the interaction between the docking system 112 and the wheelchair 100 is provided. The control system 1100 may include a controller 1102 which includes a memory unit and processor. The memory is capable of storing logic, algorithms, software, etc. for performing one or more tasks. The memory may further store information, collect data, and receive information from other controllers such as a vehicle controller 1114, engine controller 1116, and transmission controller 1118. The processor or processing unit may be capable of executing the logic, algorithms, software, etc.

In one embodiment, the controller 1102 is a stand-alone controller for controlling the docking system 112. In another embodiment, the controller 1102 may be the vehicle controller 1114, the engine controller 1116, the transmission controller 1118, or any other controller found on a vehicle. Moreover, the controller 1102 may be remotely located from the vehicle and communicate with the docking system over a wireless communication network such as Wi-Fi.

The controller 1102 may be in communication with a user control 1108 which may be located in the vehicle. Alternatively, the user control 1108 may be remote from the vehicle. In any event, a user such as the wheelchaired passenger or vehicle operator may send instructions to the controller 1102 by actuating the user control 1108.

In turn, the controller 1102 may communicate with the user by displaying a signal, data, information, instructions, etc. via a display 1110 or dashboard 1112. The display 1110 or dashboard 1112 may be located in the vehicle. The display 1110 may be a computer display. The signal may be communicated by illuminating a light in the vehicle to alert the user that the docking station 112 is engaged with the wheelchair 110 or vice versa. Other types of signals are also possible.

The controller 1102 may be in communication with the first actuator 334 and second actuator 600 of the docking system 112. In this manner, the controller 1102 may command either or both actuators to extend or retract. This may be based on a user command via the user control 1108, or it may be part of the control logic, algorithms, software, etc. executed by the processor of the controller 1102.

The controller 1102 may receive signals from one or more sensors. For example, the sensor 518 may detect the position of the locking pin 224 and communicate this position to the controller 1102. A second sensor 1104 may detect a position of the first actuator 334 and/or second actuator 600. For example, the controller 1102 may command the actuator 334 to extend by a desired amount. The second sensor 1104 may detect how much the actuator 334 has extended and communicate the same to the controller 1102. In this way, the controller 1102 receives feedback from the sensor 1104 and can further adjust its commands to either actuator.

The control system 1100 may include a third sensor 1106 which may be positioned on the docking system 112 and is able to detect an oncoming wheelchair 100. The third sensor 1106 may be a proximity sensor, Hall Effect sensor, or any other type of sensor. The third sensor 1106 may detect a height or clearance between a bracket 200 on the approaching wheelchair 100 and communicate the same to the controller 1102. In turn, the controller 1102 may actuate the first actuator to cause the docking system 112 to move upwards or downwards based on the detected clearance by the third sensor 1106. In doing so, the second sensor 1104 can detect how far and in what direction the actuator 334 moves in order to determine if the actuator 334 responded correctly based on the instruction from the controller 1102. A fourth sensor (not shown) may detect the height of the coupler mechanism 218 relative to the vehicle floor 108 and communicate the same to the controller 1102. Thus, the controller 1102 is able to receive signals indicative of an approaching wheelchair 100, the desired height of the docking system 112 for receiving the wheelchair 100, the actual height of the docking system 112, and the responsiveness of the first actuator 334 for adjusting the height of the docking system 112.

Additional control logic or algorithms may be performed by the control system 1100 for docking the wheelchair 100 to the docking system 112. One or more controllers may execute the control logic or algorithms. In a further embodiment, the wheelchair may include a controller or transmitter for communicating with the control system 1100. In this manner, the transmitter or controller on the wheelchair may alert the controller 1102 or third sensor 1106 of its approach.

Figure 12:
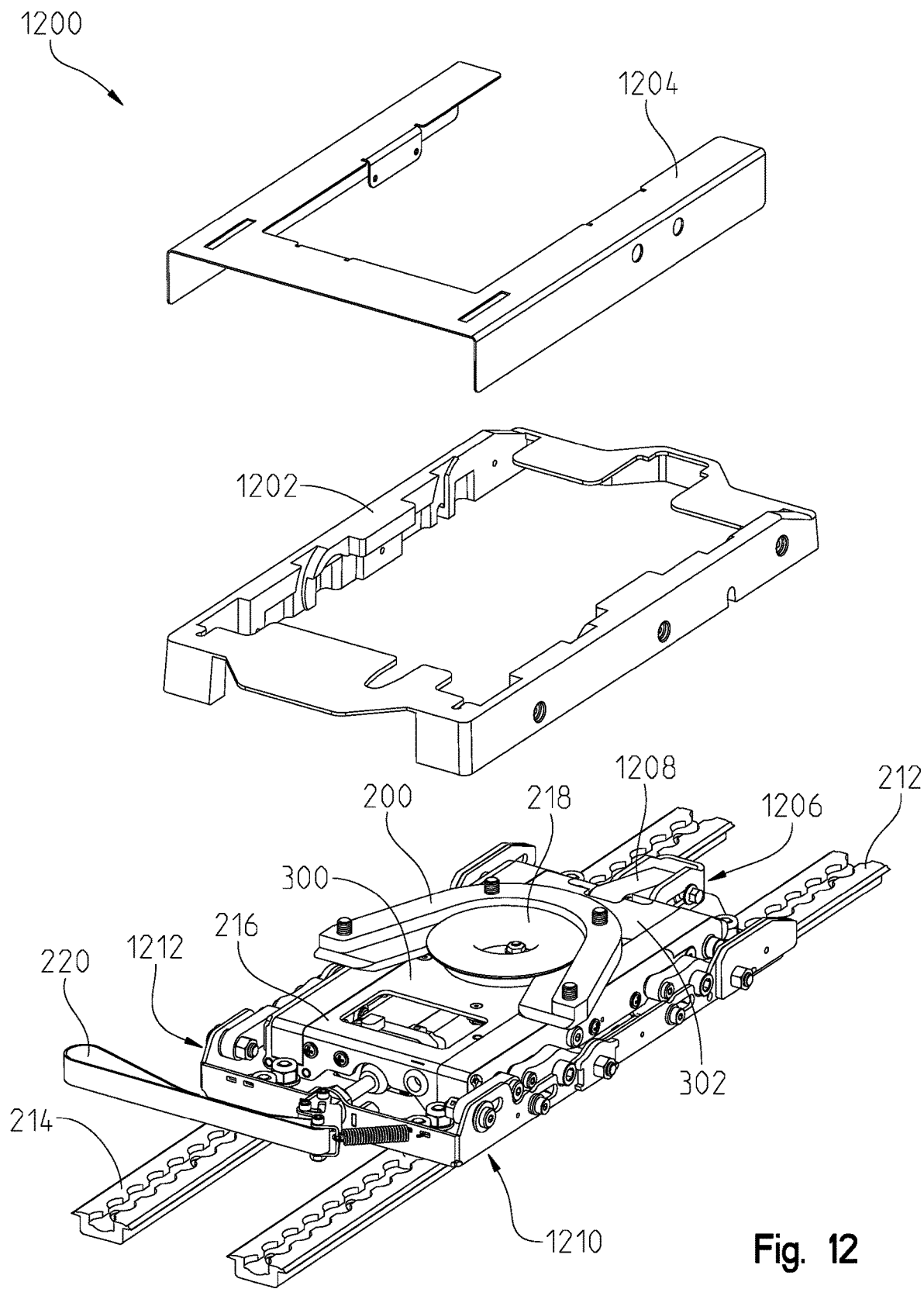
FIG. 12 is a partial exploded and perspective view of another embodiment of a wheelchair docking system.
Figure 13:
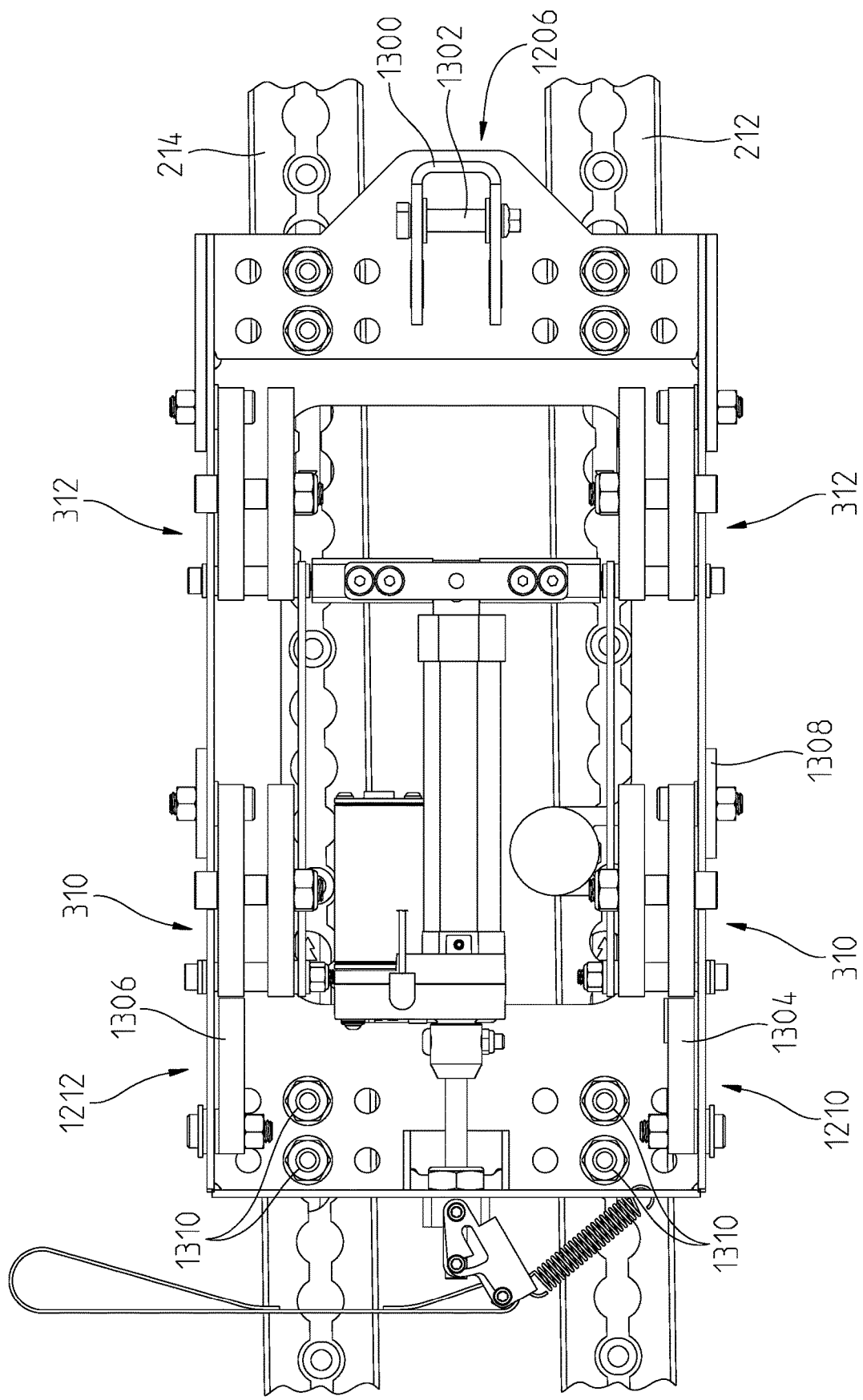
FIG. 13 is a top view of the wheelchair docking system of FIG. 12 with a top portion thereof removed.

Referring now to FIGS. 12 and 13, a different embodiment of a wheelchair docking system 1200 is illustrated. For sake of brevity, features in the embodiment of FIGS. 12 and 13 that remain unchanged from the embodiments in FIGS. 1-11 include the same reference number. For this reason, only the features that have changed between embodiments will be addressed.

In FIG. 12, the wheelchair docking system 1200 may include a lower protective shroud 1202 and an upper protective shroud 1204. The lower protective shroud 1202 may be formed of a plastic material formed by any known process such as injection molding. The upper protective shroud 1204 may be formed of sheet metal or similar material. The pair of shrouds provide additional safety and aesthetic benefits to the wheelchair docking system 1200.

The docking system 1200 may also include a plurality of tether assemblies for increased structural integrity and improvement. For instance, a rear tether assembly 1206 is depicted in FIGS. 12 and 13 having a rear load tether strap 1208. The rear load tether strap 1208 may be coupled at one end to a pin 1302 which is affixed to a mounting bracket 1300. The mounting bracket 1300 may be welded or otherwise coupled to the lower portion 302 of the system 1200. In at least one embodiment, the pin 1302 may pivot or rotate about an axis within the bracket 1300.

The rear load tether strap 1208 may be coupled at its opposite end to the top portion 300 of the system. The rear tether assembly 1206 may be approximately centrally located as shown in FIGS. 12 and 13. Moreover, the top portion 300 may be a cast material for improved structural integrity.

The wheelchair docking system 1200 may also include a pair of front tether assemblies. A first front tether assembly 1210 may be located at a first front corner and a second front tether assembly 1212 may be located at a second front corner. Each tether assembly may include a tether strap similar to that of the rear tether assembly 1206. For instance, the first front tether assembly 1210 may include a tether strap 1304 and the second front tether assembly 1212 may include a tether strap 1306. Each tether strap 1304, 1306 may be coupled at one end to the lower portion 302 and at the opposite end to the top portion 300.

The docking system 1200 may also include an upper and lower gussets. The lower gusset 1308 is located at the front scissor assembly 310. The upper gusset, which is not shown in FIGS. 12 and 13, is also located at the front scissor assembly 310. Each gusset may be welded to the system. In particular, the lower gusset 1308 may be welded to the lower portion 302, whereas the upper gusset may be welded to the top portion 300.

As also shown in FIG. 13, a plurality of stud bolts may be used to further couple the wheelchair docking system 1200 to the tracks 212, 214. As shown, a pair of stud bolts 1310 is shown at approximately each front corner of the system 1200 to add further structural integrity to the overall system.

While exemplary embodiments incorporating the principles of the present disclosure have been disclosed herein, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A wheelchair docking system for being coupled to a floor, comprising:
a frame having an upper portion and a lower portion, the upper portion being movable relative to the lower portion between a lowered position and a raised position;
a coupler mechanism configured to engage a wheelchair during a docking operation, the coupler mechanism being positioned on the upper portion;
a first latching mechanism being movable between a retracted position and a latching position, the first latching mechanism spaced from the coupler mechanism; and
a second latching mechanism for moving the upper portion of the frame between its lowered position and raised position;
wherein, the first latching mechanism is partially retracted by a wheelchair during the docking operation;
wherein, the first latching mechanism is biased to its latching position when the coupler mechanism engages the wheelchair.

2. The system of claim 1, wherein the first latching mechanism is biased to its latching position by a spring.

3. The system of claim 1, wherein the first latching mechanism comprises a locking pin.

4. The system of claim 3, further comprising an actuator coupled to the locking pin, the actuator being operably actuated between an extended position and a retracted position to move the locking pin between its latching position and its retracted position.

5. The system of claim 1, further comprising:
a first scissor assembly operably coupled between the upper portion and the lower portion; and
a second scissor assembly operable coupled between the upper portion and the lower portion, the second scissor assembly being spaced longitudinally from the first scissor assembly.

6. The system of claim 5, wherein the first scissor assembly and the second scissor assembly each comprises a first leg and a second leg, the first leg and second leg being coupled to one another via a connection pin.

7. The system of claim 6, wherein the first leg is disposed outwardly of the second leg.

8. The system of claim 7, wherein:
the first leg is coupled to an external location of the upper portion and an internal location of the lower portion;
the second leg is coupled to an internal location of the upper and lower portions.

9. The system of claim 6, wherein:
one end of the first leg is affixed to the lower portion and an opposite end is slidably coupled to the upper portion;
one end of the second leg is affixed to the upper portion and an opposite end is slidably coupled to the lower portion.

10. The system of claim 6, wherein the second leg of the first scissor assembly is coupled to the second leg of the second scissor assembly via a longitudinal member.

11. The system of claim 6, wherein the first or second scissor assembly is coupled to a cross member.

12. The system of claim 11, further comprising an actuator coupled to the cross member, the actuator being operably actuated between an extended position and a retracted position to move the cross member longitudinally;
wherein, as the cross member moves longitudinally, the upper portion of the frame moves between its lowered position and raised position.

13. The wheelchair docking system of claim 1, further comprising:
a first release mechanism for operably controlling movement of the first latching mechanism; and
a second release mechanism for operably controlling the second latching mechanism to move the upper portion from its lowered position to its raised position.

14. The system of claim 1, further comprising an actuator coupled to the first latching mechanism, the actuator being operably actuated between an extended position and a retracted position to move the first latching mechanism between its latching position and its retracted position.

15. The system of claim 14, further comprising a first release mechanism which comprises:
a user control for communicating with a controller, the controller operably actuating the actuator between its extended and retracted positions;
a plate coupled to the first latching mechanism via a pin, the plate being coupled to the actuator;
a spring for biasing the first latching mechanism to its latching position;
wherein, upon receiving a command from the user control to enable the first release mechanism, the controller operably actuates the actuator which moves the plate for compressing the spring;
wherein, as the spring compresses, the first latching mechanism moves from its latching position to its retracted position.

16. The system of claim 13, wherein the first latching mechanism and the second latching mechanism comprise manually-operated cables.

17. The system of claim 13, wherein the second release mechanism comprises:
a cable operably coupled to a plate having a slot defined therein;
a pin disposed within the slot for movement therein from a first position to a second position;
an actuator for operably controlling the upper portion between its lowered position and its raised position, the actuator comprising a rod operably coupled to the pin;
wherein, in the lowered position, the pin is disposed at a first end of the slot and the actuator is in a retracted position;
wherein, as the cable is pulled, the pin moves from the first end to a second end of the slot, where movement of the pin from the first end to the second end induces the rod to extend in a longitudinal direction;
further wherein, movement of the rod in the longitudinal direction induces the upper portion to move from its lowered position to its raised position.

18. The system of claim 17, further comprising:
a first scissor assembly operably coupled between the upper portion and the lower portion; and
a second scissor assembly operable coupled between the upper portion and the lower portion, the second scissor assembly being spaced longitudinally from the first scissor assembly;
wherein, as the actuator moves from its retracted position to an extended position, the first and second scissor assemblies induce the movement of the upper portion from its lowered position to its raised position.

19. The wheelchair docking system of claim 1, further comprising:
- a first tether assembly comprising a first tether strap coupled at one end to the lower portion and at an opposite end to the upper portion, the first tether assembly positioned at a rear end of the frame; and
- a second tether assembly comprising a second tether strap coupled at one end to the lower portion and at an opposite end to the upper portion, the second tether assembly positioned at a front end of the frame.

20. The system of claim 19, further comprising:
- a bracket mounted to the lower portion of the frame; and
- a pin coupled to the mounting bracket;
- wherein, the first tether strap is coupled to the pin at the one end.

* * * * *